United States Patent [19]

Böhm

[11] 4,359,354

[45] Nov. 16, 1982

[54] METHOD OF FORMING SELF-SEALING TIRE BODY COMPOSITE FOR TIRES

[75] Inventor: Georg G. A. Böhm, Akron, Ohio

[73] Assignee: The Firestone Tire & Rubber Company, Akron, Ohio

[21] Appl. No.: 126,513

[22] Filed: Mar. 3, 1980

[51] Int. Cl.³ .............................................. B60C 21/08
[52] U.S. Cl. .................................... 156/115; 152/347; 152/349; 156/118; 156/123; 264/173
[58] Field of Search ........... 156/115, 118, 119, 123 R, 156/132, 133 R; 152/346, 347, 330 R, 349, 354, 357 R, 358; 264/173

[56] References Cited

U.S. PATENT DOCUMENTS

| | | |
|---|---|---|
| 1,213,600 | 1/1917 | Dunkerley . |
| 2,782,829 | 2/1957 | Peterson et al. .................. 156/115 |
| 3,057,396 | 10/1962 | Hanson . |
| 3,183,135 | 5/1965 | Berquist ............................. 156/117 |
| 3,229,013 | 1/1966 | Newton et al. . |
| 3,615,987 | 10/1971 | Blatz .................................. 156/133 |
| 3,776,792 | 12/1973 | Grawey . |
| 3,903,947 | 9/1975 | Emerson . |
| 3,935,893 | 2/1976 | Stang et al. . |
| 3,952,787 | 4/1976 | Okado et al. . |
| 3,981,342 | 9/1976 | Farber et al. . |
| 4,113,799 | 9/1978 | Van Ornum et al. . |
| 4,140,167 | 2/1979 | Böhm et al. ........................ 156/115 |
| 4,163,467 | 4/1979 | Dobson . |

FOREIGN PATENT DOCUMENTS 1370281 10/1974 United Kingdom ............... 425/132
2050933 1/1981 United Kingdom .

*Primary Examiner*—Michael W. Ball

[57] ABSTRACT

A tubular and generally circular self-sealing tire body composite and method of making the same for use in the construction of tires (for example, radial) having at least a spliceless innerliner layer and a spliceless sealant layer. Desirably, the sealant layer is shorter than the innerliner layer and is centered with respect thereto. The tubular composite can be made by utilizing an innerliner stock and a sealant stock, forming layers therefrom and contiguously contacting said layers to form a contiguous, tubular and generally circular article for subsequent use in building a tire. Additionally, a ply stock may be used, formed into a layer with cord incorporated therein, and contiguously applied to said innerliner layer.

17 Claims, 7 Drawing Figures

METHOD OF FORMING SELF-SEALING TIRE BODY COMPOSITE FOR TIRES

BACKGROUND OF THE INVENTION

The present invention relates to a tubular and circular self-sealing composite having at least an innerliner in contiguous relationship with a sealant layer with the resulting composite used in the preparation of tires. More specifically, the present invention relates to a tubular self-sealing composite which is continuously and splicelessly formed, cut, and utilized in the manufacture of tires, for example, radial tires.

Heretofore, tires have been manufactured by utilizing a sealant which is applied to an innerliner portion or to the inner periphery of the tire to prevent loss of air upon puncture as by a nail or other object. One of the conventional practices was to apply the sealant material in a dissolved state as by spraying or coating. Such method required the cleaning of the inner surface of the cured tire and the application of the sealant, both by elaborate and expensive equipment. Upon incorporation of the sealant layer into the tire, the solvent would evaporate and enter the air of the factory and thus create potential health problems as well as create environmental and ecological problems. Also, some of the solvent would remain in the tire and evaporate at a later point in time, for example, in a warehouse or in the trunk of a car.

U.S. Pat. No. 1,488,343 is directed to the manufacture of pneumatic tire casing wherein the plies of the carcass and breaker-strip are conventionally molded under heavy pressure; buckling is avoided.

U.S. Pat. No. 3,372,078 is directed to the lamination of at least two layers, each layer having a different cure system. When the two layers are brought together under mild heat treatment, the ingredients comingle at the interface and result in a partial cure.

U.S. Pat. No. 3,933,566 teaches the partial cure or precure of multilayer tire innerliners via radiation to increase green strength.

It is noted that none of these patents teach or suggest a spliceless, tubular innerliner composite, or method for making same.

U.S. Pat. No. 4,140,167 to the same inventor as herein, eliminated the solvent-sealant application by utilizing a sealant which was at least partially degraded by irradiation or heat in the presence of a peroxide. The sealant was in the form of a blend or a laminate and was made and applied in the form of a sheet or strip. The blend or some of the layers of the laminate contained various chemical agents, which either assist or retard cure by irradiation so that the blend or the layers had different physical characteristics during the manufacture of the end products containing the laminate. Thus, the sealant would be initially tough during the initial building state and then the sealant or a portion of the laminate could be degraded by irradiation and form a soft pliable layer as the sealant. Moreover, the sealant still had to be spliced. As known to those skilled in the art, during expansion of the tire building drum, a spliced tire would open up if the spliced adhesion was poor. It is noted that although a coextrusion process could be utilized, it only related to the preparation of strips and not to spliceless, tubular, and circular innerliner composites.

OBJECTS OF THE INVENTION

It is therefore an object of the present invention to provide a tubular, spliceless, self-sealing body composite for a tire.

It is another object of the present invention to provide a spliceless, tubular self-sealing composite, as above, which is readily and inexpensively produced.

It is yet another object of the present invention to provide a spliceless, tubular self-sealing composite, as above, which eliminates one of the problems of the prior art, that is the costly spraying or coating techniques of applying a sealant layer to a tire.

It is yet another object of the present invention to provide a spliceless, tubular self-sealing composite, as above, in which said sealant layer and said composite is produced by automatic equipment.

It is yet another object of the present invention to provide a spliceless, tubular self-sealing composite, as above, wherein said sealant layer is located between adjacent and contiguous innerliner layers.

It is yet another object of the present invention to provide a spliceless, tubular self-sealing composite, as above, wherein said sealant layer is located between and contiguous to an innerliner layer and a ply layer.

It is yet another object of the present invention to provide a spliceless, tubular self-sealing composite, as above, wherein said composite is located between contiguous innerliner layers, with said innerliner layers contiguously located on a ply layer.

It is yet another object of the present invention to provide a spliceless, tubular self-sealing composite, as above, wherein said composite can be utilized in the manufacture of radial tires.

It is yet another object of the present invention to provide a spliceless, tubular self-sealing composite, as above, wherein at least one sealant stock and at least one innerliner stock is fed to a die which extrudes a circular, tubular composite having at least one sealant layer and at least one innerliner layer contiguous to each other.

It is yet another object of the present invention to provide a spliceless, tubular self-sealing composite, as above, wherein said tubular, circular, spliceless composite is cut and applied to a tire-building drum.

It is yet another object of the present invention to provide a tire, preferably a radial tire, with a spliceless tubular self-sealing composite, as above, with said composite having at least a sealant layer and an innerliner layer.

It is yet another object of the present invention to provide a tire, preferably a radial tire, with a spliceless, tubular self-sealing composite, as above, wherein said composite contains at least one fiber reinforced ply layer.

These and other objects of the present invention will become apparent from the following specification.

In general, a self-sealing composite for a tire, comprises: the composite having at least an innerliner layer and at least a sealant layer, said composite being tubular and spliceless.

Additionally, a pneumatic tire having a self-sealing layer, comprises: an annular road-engaging thread surface, two sidewalls, and two annular beads, one said sidewall connecting said tread surface to one of said annular beads and the remaining sidewall connecting said tread surface to the remaining annular bed, and a tubular composite, said tubular composite having at least one self-sealing sealant layer and at least one innerliner layer, said tubular composite being spliceless.

Additionally, a method for making a self-sealing body composite for tires, comprises the steps of: forming at least one innerliner layer, forming at least one sealant layer, contiguously contacting said innerliner layer and said sealant layer, and forming said contiguous sealant layer and said innerliner layer into a spliceless tubular self-sealing composite.

Additionally, a method for the manufacture of a pneumatic tire having a self-sealing layer, comprises the steps of: forming at least one self-sealant layer, forming at least one innerliner layer, contiguously contacting said innerliner layer with said sealant layer, forming said contiguous sealant layer and said innerliner layer into a spliceless tubular self-sealing composite, assembling an unvulcanized tire, said tire having a self-sealing tubular composite therein, and vulcanizing said tire to form a cured tire having said spliceless tubular self-sealing composite therein.

PREFERRED EMBODIMENTS OF THE INVENTION

A self-sealing innerliner composition according to the concepts of the present invention has at least one sealant layer and at least one innerliner layer. Additionally, the composite can have at least one ply layer which generally contains a cord therein, for example, steel, polyester, nylon, rayon, or the like.

Figure 1:
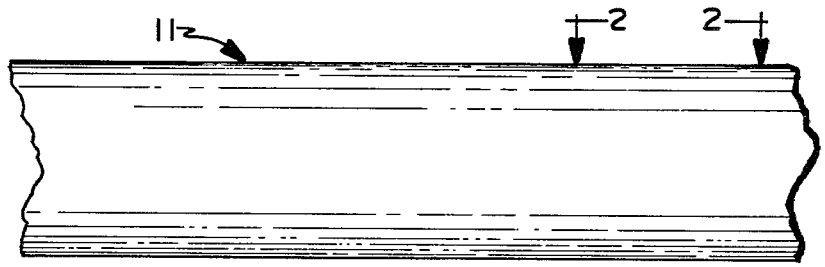
FIG. 1 is a side view of a contiguous, circular and spliceless tubular self-sealing composition of the present invention.

According to the present invention, the spliceless, tubular, self-sealing innerliner composition is readily and easily made as through extruding a circular and tubular composite containing various desired layers therein. The layers are generally in contiguous relationship. Circular tube 11 can be made by forming the various desired stocks and extruding them through a generally circular die having an inner diameter approximately equal to the outer diameter of the tire building drum. As known in the art, different sized tires will have different sized building drums. For example, an innerliner material may be extruded in a conventional extruder and fed to a circular die. Additionally, a conventional sealant may also be extruded by a second conventional extruder and fed to a circular coextruding die (or a portion thereof). If a ply layer is desired, a conventional ply stock may be made by a third conventional extruder and fed to the die. A cord material can also be incorporated within the ply layer. The various stocks are then brought together by a single die and coextruded into a spliceless, circular, tubular material as shown in FIG. 1, usually in a contiguous manner. This process can be automated.

Due to the existence of a plurality of layers, several combinations forming the composite can be made, two of which are shown in the drawings. Considering FIG. 2, it relates to an embodiment of the invention wherein innerliner 12 extends longitudinally along the entire length as well as the circumference of the circular tube. At predetermined portions thereof, one of which is shown, sealant 13 is contiguously applied along a desired length of the innerliner. Thus, although sealant 13 extends about the entire inner circumference of the tube, the application of a finite length of sealant along the tube results in an item that when incorporated into a tire, generally extends from tire shoulder to tire shoulder. With regard to innerliner 14, it extends only along a portion of composite tube 11 such that it sufficiently encapsulates or covers sealant 13. However, layer 14 can be extruded either separately or integral with layer 12 and extends about the entire circumference of the tube. If innerliner layer 14 is separately made, it is contiguous to sealant layer 13.

Figure 2:
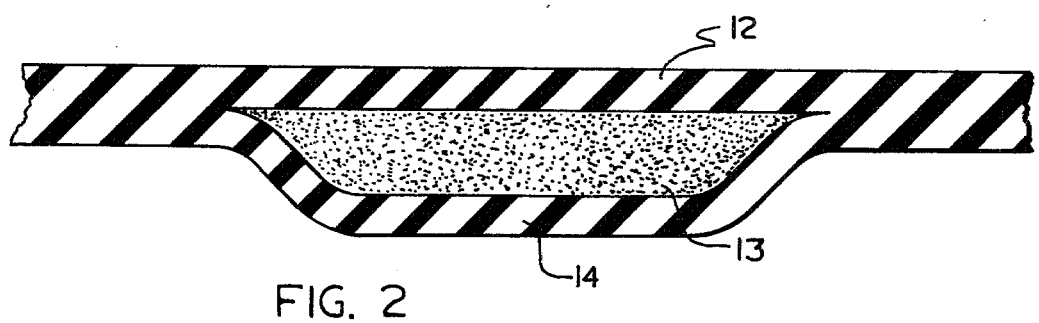
FIG. 2 is a cross-sectional view taken on line 2—2 of FIG. 1.
Figure 4:
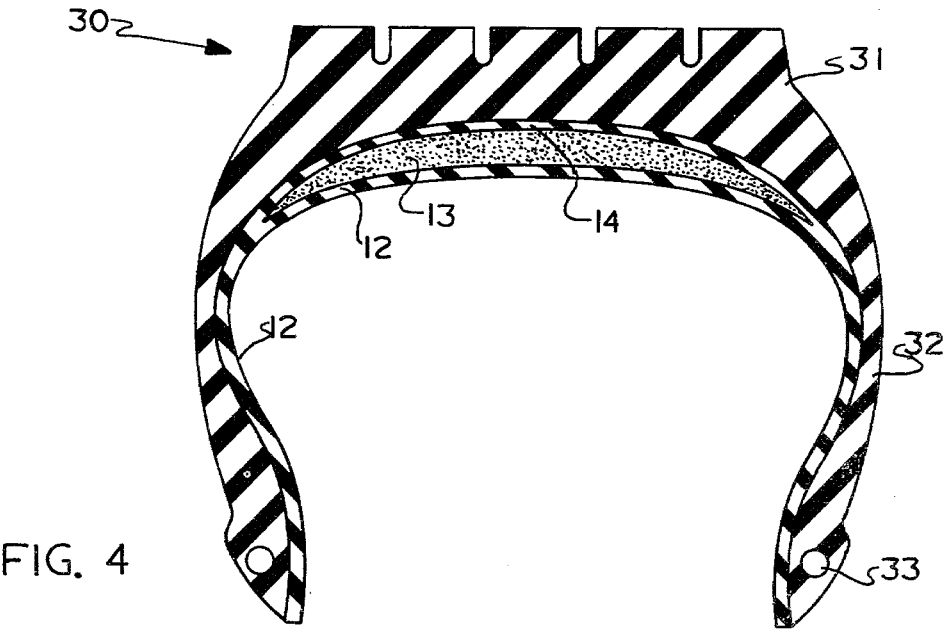
FIG. 4 shows the layers of FIG. 2 in a tire.
Figure 5:
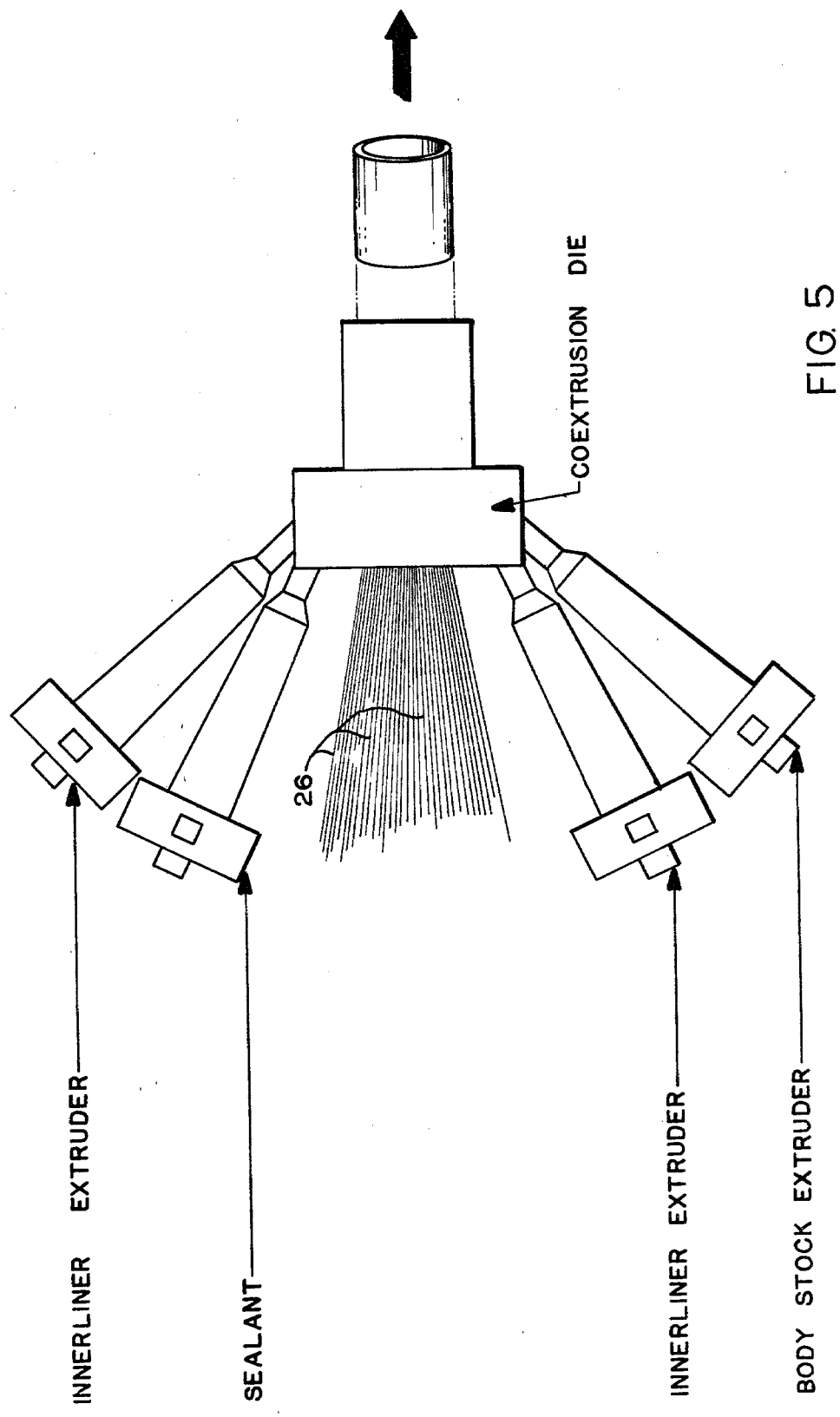
FIG. 5 is a schematic view of various extruders and a coextrusion die for making the spliceless tubular self-sealing composition.
Figure 6:
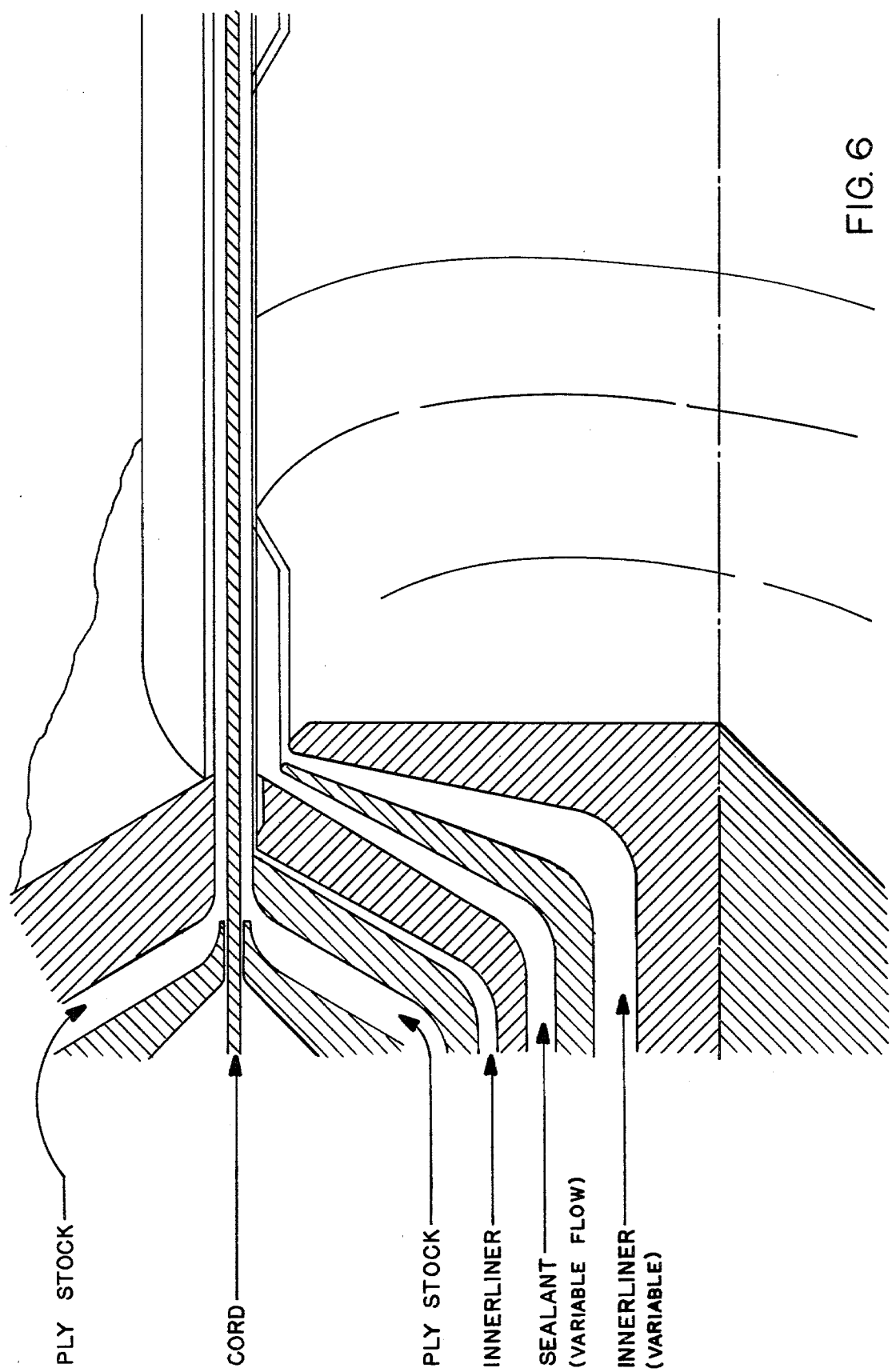
FIG. 6 is a cross-sectional view of a coextrusion die.
Figure 7:
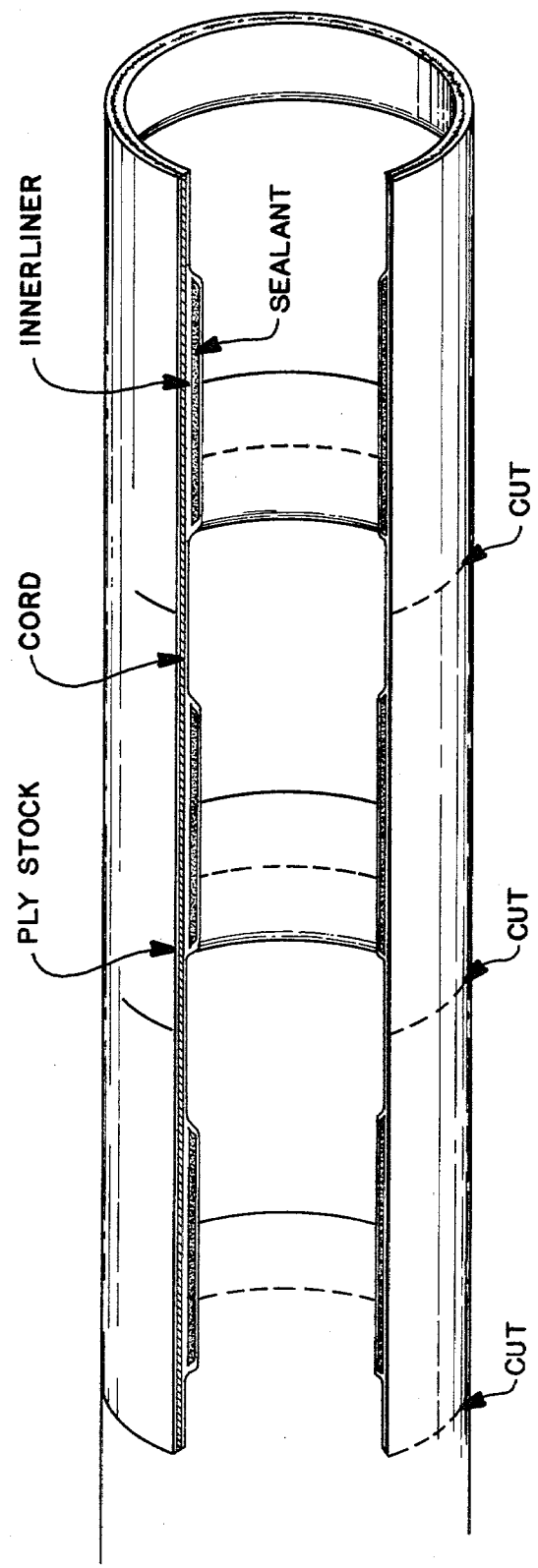
FIG. 7 is a cut-away view of the tube produced by the present invention.

The self-sealing tubular innerliner composite as shown in FIG. 2 is cooled, then cut at an appropriate length, that is between adjacent sealant portions 13, placed upon a collapsed tire building machine, and a tire built in a conventional manner. Thus, ply layers can be added to the self-sealing innerliner composite, tire beads 33 applied, etc., and then shaped to the conventional tire torroid configuration with a tread portion 31, and sidewall portion 32 molded thereto. The final result is tire 30 as shown in FIG. 4 wherein self-sealing layer 13 is located beneath the thread portion with innerliner portion 12 extending from bead to bead.

Figure 3:
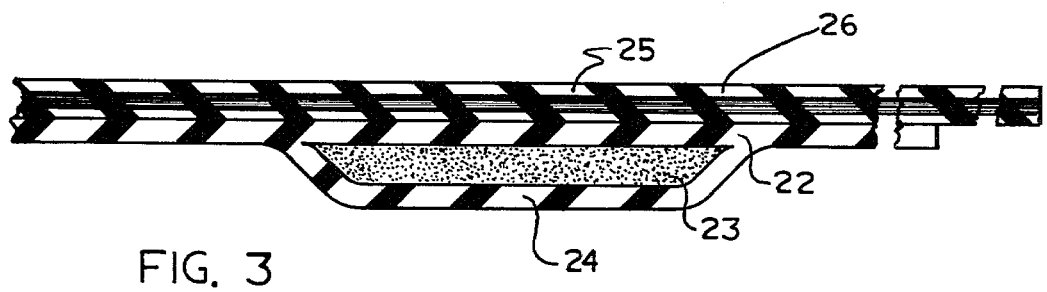
FIG. 3 is a view similar to FIG. 2, but showing the innerliner layers contiguous to a ply layer.

In the embodiment of FIG. 3, a self-sealing innerliner composite (e.g., as shown in FIG. 2) having an innerliner layer 22, a sealant layer 23, and a covering or encapsulating layer 24 is contiguously attached to ply layer 25 having cords 26 therein. As shown in FIG. 3, layer 22 constitutes a discontinuous innerliner along the length (longitude) of the tube with ply layer 25 constituting a continuous layer in the embodiment. As before, self-sealant layer 23, preferably constitues only a small portion or finite length in the longitudinal direction of the tube. However, it extends about the entire circumference of the tube, as does the innerliner layers and the ply layer. The aspect of a limited sealant length portion can be readily achieved during extruding through the die, simply by supplying such sealant material only during a portion, that is at various time intervals of the extruding process. Naturally, the time intervals will vary with the tire size. Additionally, the thickness can be varied by controlling the output of the sealant. The self-sealing innerliner composite is then applied to a collapsed building drum, with the remaining portion of the tire being made in a conventional manner.

Regardless of the arrangement of the various layers, the number of each layer, and the like, the result is a tire which has a sealant portion already therein so that upon final molding and vulcanization, a complete tire is made. The self-sealing composite is preferably utilized in the making of radial tires since any cord material can be coextruded along with the ply stock in a straight path, that is in a longitudinal direction along tube 11.

The present product as well as method thereof eliminates the elaborate process and expensive materials required to apply a self-sealant layer to the inner periphery of a tire according to conventional processes. It furthermore alleviates one of the prior art problems, that of solvent evaporation.

In accordance with conventional practice, the innerliner layer or layers may be made of conventional elastomers which are impervious to air. For example, butyl rubbers (that is copolymers of isobutylene with a small amount of isoprene) may be utilized. Also, if a ply layer or layers are utilized, they are made of conventional elastomers and cord material well known to the art.

Similarly, the sealant layer may be made of conventional rubbers as well known to those skilled in the art. For example, any of the sealant compounds set forth in the following United States patents may be utilized: U.S. Pat. Nos. 3,903,947; 3,935,893; 3,952,787; 3,981,342; 4,113,799; and 4,163,467.

Another sealant which can be utilized is a blend containing roughly about 20 percent by weight of a crosslinkable butyl rubber (weight average molecular weight of roughly 100,000); roughly about 70 percent by weight of a low molecular weight rubber, for example, polyisobutylene (not crosslinkable) having a weight average molecular weight of from about 1,000 to about 10,000; and, roughly about 10 percent by weight of a reinforcing filler such as carbon black.

In lieu of the sealant stock and innerliner stock disclosed above, the sealant stock may contain a material as set forth in my prior United States patent application, now U.S. Pat. No. 4,140,167, which is hereby fully incorporated by reference. For example, the formed sealant layer can contain a blend of material which is at least partially degraded by irradiation or heat in the presence of a peroxide. Moreover, the sealant stock or the innerlayer stock may contain agents which either assist or retard cure by irradiation so that the formed layers will have different physical properties during the manufacture of the end products containing said layers. Generally, a sealant may be utilized as set forth in my prior patent which is tough. However, once the tire has gone through the conventional building steps, irradiation or heat is applied, thereby rendering the sealant layer soft and pliable and capable of functioning as a puncture sealant layer within the innerliner layer. That is, the sealant layer has an initial high viscosity but the material degrades to a much lower viscosity upon the application of heat or irradiation.

With regard to the various combinations of layers, specific types of materials, specific amounts of materials, specific types of peroxides and the like, reference is hereby made to U.S. Pat. No. 4,140,167.

However, in accordance with the present invention, such materials and layers, rather than being extruded in strips, are extruded in the form of a spliceless circular tube which can then be applied to a building drum for subsequent conventional operations well known to those in the tire building art. Moreover, in accordance with the present invention, the various layers may be varied in thickness as well as being applied to only specific longitudinal portions of the tube in accordance with the above teachings.

Whether or not degradable materials or stocks are utilized, various layers may be extruded by conventional extruders and fed to an extruding die. The design of various coextrusion dies is described in various patent literature and basically falls into two categories. The first type is one in which the melt streams of the different stocks to be combined in the composite are brought together in the feed port prior to entering the die itself. The die portion subsequently shapes the combined melt streams into the desired structure or layers. This construction is particularly useful in the manufacture of composites containing many layers. In the second type of dies, the melt streams of the different stocks are combined close to the exit of the die. This latter design is simple and does not require perfect matching of the melt stream viscosities. Regardless of type of die utilized, generally the innerliner layers and the ply layers are of constant thickness, although they may be varied. The sealant layer, as apparent from the drawings, is naturally varied from deposition of the sealant layer to no deposition at all. The output or thicknesses of the various layers can be accomplished by pneumatically controlled restrictions at the extruder exit or by a fast change in the RPM of the extruder screw. Preferably, the thicknesses of the layer are regulated at the output of the die itself. Thus, in the case of a circular die, a ring-shaped gate can be utilized which constricts, in a controlled way, the circular channel which supplies the stock in the dimension and/or thickness desired. As previously noted, the extruders are conventional and any several different types may be utilized. For example, an extruder which can be attached to vacuum pumps and thus eliminates air in various volatiles of the stock is often desirable for the extrusion of butyl or chlorobutyl-based stocks which easily trap and retain air. Generally, hydraulically driven cold feed extruders are preferred. The various extruders are generally operated at the same time, for example, simultaneously, during the extruding of the various stocks and fed to the single die.

As apparent from the above, a generally circular, spliceless, tubular self-sealing innerliner composite is produced containing sealant of various desirable thicknesses at appropriate portions along the length of longitude of the tube. The tube is generally continuously produced and thus no splicing is required. Hence, the innerliner as well as tire plies are strong and dimensionally uniform. That is, it does not have any weak portions or points, or additional weight at a specific location, as commonly encountered in conventional spliced areas of presently existing tires. The various layers are contiguous and the coextension process enhances adhesion of adjacent layers. Any arrangement of such extruders and extruding dies can be utilized to form any number of layers or combinations thereof. Thus, although only two specific embodiments have been set forth above, it should be apparent that numerous other combinations of the layers exist to make a self-sealing composite suitable for use in constructing a tire. For example, a specific composite may contain an innerliner layer, a sealant layer, and a ply layer which can be attached to another ply layer in the tire. Another embodiment can be an innerliner layer, a sealant layer, a second innerliner layer, and a second sealant layer, which can be attached to a ply layer in the tire. Thus, the present invention is not limited by the specific combination of layers so long as a spliceless, tubular, self-sealing innerliner composite is produced.

Having described in accordance with the patent statutes, the preferred embodiments and the best mode, reference is made to the following claims which set forth the scope of the invention.

What is claimed is:

1. A method for forming a self-sealing tire with a seamless tubular innerliner layer and a seamless sealant layer therein, comprising the steps of:

extruding at least one seamless tubular innerliner layer, extruding at least one tacky seamless sealant layer of a finite length in a longitudinal direction, extruding said seamless sealant layer about the entire circumference of said tubular innerliner layer, simultaneously coextruding said tubular innerliner layer and said sealant layer, contiguously contacting said innerliner layer and said sealant layer, and extruding said contiguous sealant layer and said innerliner layer into a spliceless tubular self-sealing composite at a diameter so that a tire can be made therefrom.

2. A method according to claim 1, including forming said sealant layer at a longitudinal length less than said innerliner layer length.

3. A method according to claim 2, including extruding at least a covering innerliner layer which covers said sealant layer upon said innerliner layer, and including forming a contiguous contact between said sealant layer, said innerliner layer, and said covering innerliner layer to form said spliceless tubular composite.

4. A method according to claim 3, including extruding at least one continuous ply layer, contiguously contacting said ply layer with said innerliner layer.

5. A method according to claim 4, including extruding said covering innerliner in a finite length in the longitudinal direction of said tubular composite, which length is greater than said sealant layer length so that said sealant layer is encapsulated.

6. A method according to claim 5, including simultaneously coextruding said sealant layer, said ply layer, said innerliner covering layer, and said innerliner layer.

7. A method according to claim 3 or 5, including forming a plurality of said finite sealant layer along the longitudinal length of said composite.

8. A method according to claim 3, 5, wherein said sealant layer comprises a blend of an irradiation degradable polymeric material and an irradiation crosslinkable polymeric material, said degradable polymeric material selected from the group consisting of polyisobutylene, copolymers containing polyisobutylene, and polyethylene oxide, and said crosslinkable polymeric material selected from the group consisting of natural rubber, copolymers of butadiene and styrene, and halogenated butyl rubber, said polymeric materials being present in a ratio between 75 percent degraded-25 percent crosslinked to 25 percent degraded-75 percent crosslinked.

9. A method according to claim 8 wherein said innerliner layer has a polymeric material that crosslinks on exposure to irradiation, and wherein said sealant layer comprises an irradiation degradable polymeric material that at least partially degrades on exposure to irradiation.

10. A method for the manufacture of a pneumatic tire having a seamless self-sealing layer and a seamless innerliner layer, comprising the steps of:

extruding at least one self-sealing tacky seamless layer of a finite length in a longitudinal direction, extruding at least one seamless tubular innerliner layer, extruding said seamless sealant layer about the entire circumference of said tubular innerliner layer, simultaneusly extruding said seamless tubular innerliner layer and said seamless sealant layer, contiguously contacting said innerliner layer with said sealant layer, extruding said contiguous sealant layer and said tubular innerliner layer into a spliceless tubular self-sealing composite at a diameter so that a tire can be made therefrom, assembling an unvulcanized tire in a toroid shape, said tire having self-sealing tubular composite therein, and vulcanizing said tire to form a tire.

11. A method according to claim 10, including extruding at least a covering innerliner layer covering said sealant layer on said innerliner layer, and forming a contiguous contact between said self-sealing layer and said covering innerliner layer.

12. A method according to claim 11, including extruding a continuous ply layer, contiguously contacting said ply layer with said innerliner layer.

13. A method according to claim 11, including extruding said covering innerliner in a finite length in the longitudinal direction of said tubular composite, which length is greater than said sealant length so that said sealant layer is encapsulated.

14. A method according to claim 13, wherein said innerliner layer has a polymeric material that crosslinks on exposure to irradiation, and wherein said sealant layer comprises an irradiation degradable polymeric material that at least partially degrades on exposure to irradiation.

15. A method according to claim 13, including a sealant layer comprising a blend of an irradiation degraded polymeric material and an irradiation crosslinked polymeric material, said degraded polymeric material selected from the group consisting of polyisobutylene, copolymers containing polyisobutylene, and polyethylene oxide, and said crosslinked polymeric material selected from the group consisting of natural rubber, copolymers of butadiene and styrene, and halogenated butyl rubber, said polymeric materials being present in a ratio between 75 percent degraded-25 percent crosslinked to 25 percent degraded-75 percent crosslinked.

16. A method according to claim 10, or 13 including making said tire into a radial tire.

17. A method according to claim 16, including simultaneously extruding and forming said contiguous contact between said layers and forming said spliceless tubular composite.

* * * * *